United States Patent [19]

Langé et al.

[11] Patent Number: 4,536,868
[45] Date of Patent: Aug. 20, 1985

[54] PROTECTED OPTICAL DISK WITH A FREE LAYER HOLDER

[75] Inventors: Francois Langé ; Jean Cornet, both of Paris, France

[73] Assignee: Thomson-CSF, Paris, France

[21] Appl. No.: 501,190

[22] Filed: Jun. 6, 1983

[30] Foreign Application Priority Data

Jun. 8, 1982 [FR] France ................................ 82 09959

[51] Int. Cl.³ ............................................ G01D 15/32
[52] U.S. Cl. .................................................... 369/284
[58] Field of Search ........................ 369/284, 286, 283

[56] References Cited

U.S. PATENT DOCUMENTS 4,331,966  5/1982  Moe ..................................... 369/284
4,365,258 12/1982  Guier et al. ......................... 369/284
4,380,016  4/1983  Lehureau et al. ................... 369/284

FOREIGN PATENT DOCUMENTS 2491664  4/1982  France .

OTHER PUBLICATIONS

Patents Abstracts of Japan, vol. 5, No. 150, Sep. 22, 1981, (P81) (822), & JP-A- 56 83851, (Tokyo Shibaura Denki), (08-07-1981).

Primary Examiner—Steven L. Stephan
Attorney, Agent, or Firm—Oblon, Fisher, Spivak, McClelland & Maier

[57] ABSTRACT

The invention relates to protected optical disk structures. The invention relates placing the sensitive layer on a substrate, which is only joined to the other elements constituting the box by a single fixing area, located in the central part of said box, in order that deformations of the box do not affect the smoothness and flatness of the substrate.

11 Claims, 9 Drawing Figures

PROTECTED OPTICAL DISK WITH A FREE LAYER HOLDER

BACKGROUND OF THE INVENTION

The present invention relates to a support in the form of a protected disk, used for the recording and optical reading of information arranged in the form of coplanar tracks centered with respect to a rotation axis. The information is contained on a carrier layer formed from a material, whose optical properties are modified under the action of a light beam.

Disk structures for the optical recording of information are generally formed by a light radiation-sensitive layer deposited on a rigid support. To protect the sensitive layer from mechanical damage which can be caused by an external agent, it is known to confine it between two plates forming the walls of a protective enclosure. Another method consists of depositing a thick protective layer on the sensitive layer, which is itself supported by a substrate. However, this procedure has a number of important disadvantages. The thick protective layer deposited on the sensitive layer leads to a drop in the sensitivity of the layer to the inscription radiation. In addition, any sublimation or decomposition products which may have formed cannot be freed, which is prejudicial to the quality of the inscription. This has led to optical disks being produced with a protective enclosure. This protective method consists of providing above the sensitive layer, a closed space in the form of an annular chamber by means of spacers inserted between two plates or by a cap-like configuration given to either of the aforementioned members. The structures of the protected optical disk then comprise a first element supporting the sensitive layer and a second element integral with the first.

It is known to join these two elements by their central and peripheral areas, either by means of joined spacers, or by the cap-like configuration given to one of them, fixing also being ensured by the central and peripheral areas of the structure. Although this type of structure leads to the sensitive layer being well protected against mechanical agents and moisture, it leads to certain disadvantages. Thus, the structures of the protected optical disk may deform, e.g. camber or bend, under the action of differential expansions between the elements due to the action of external agents on the materials used for producing these elements, optionally due to the contraction of the weld bead used for fixing them, or for any other reason, such as heat moisture, etc. However, if these deformations are of a minimal magnitude, they are very prejudicial to the flatness and smoothness of the recording-carrying layer, because the information is generally in the form of microscopic elements resulting from the interaction of the layer with a finely focused radiation beam. A solution using two protective plates surrounding a layer support with central and peripheral connections can lead to untimely deformations.

SUMMARY OF THE INVENTION

In order to obviate the aforementioned disadvantages, the invention proposes a structure having a layer holder surrounded by two protective plates forming an enclosure. The layer holder is only joined to the enclosure by an annular fixing area located within the recording zone. Possible deformations to the box constituted by two protective elements then no longer affect the flatness and smoothness of the layer holder.

Thus, the present invention relates to a protected disk structure for the optical recording and reading of information in at least one storage layer, having a layer holder with a planar face, the information being stored in an annular zone centred on the rotation axis of the disk, closing elements for forming a protective box being placed on either side of the layer holder, said box giving access to optical reading and/or writing radiation and defining an annular chamber, said structure having a central hole centred with respect to the said axis and permitting the passage of a driving spindle, wherein the elements of the box are only connected to the layer holder by a single fixing area located within the annular zone and around the central hole.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
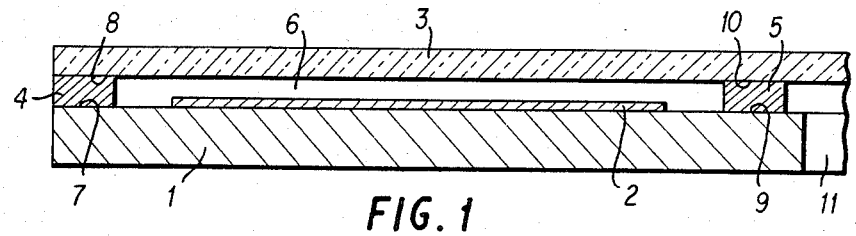
FIGS. 1 to 3 part-sectional views of protected optical disks according to the prior art.

Various protected optical disk structures have already been proposed. FIG. 1 is a part-sectional view of a prior art optical disk. The section is a meridian section containing the rotation axis of the disk. The same applies with regards to the following drawings. It is possible to see a rigid disk-shaped substrate 1, forming a first element of a structure. Substrate 1 supports an inscription layer 2. The second element of the structure is formed by the disk 3, kept above the inscription layer by means of circular, concentric spacers 4, 5. Elements 1, 3 and spacers 4, 5 define an annular space 6 overhanging the inscription layer. Elements 1 and 3 are joined by means of spacers 4 and 5. The fixing of these elements to the spacers takes place along peripheral areas 7, 8 and central areas 9, 10. The structure is centrally perforated by a hole 11 permitting the passage of a driving spindle. The materials of disks 1 and 3 will be chosen as a function of whether the disk is intended to operate in reflection or in transmission. It is obvious that differential expansions between disks 1 and 3 will lead to a deformation of substrate 1, which will impair the flatness and smoothness of the inscription layer.

Figure 2:
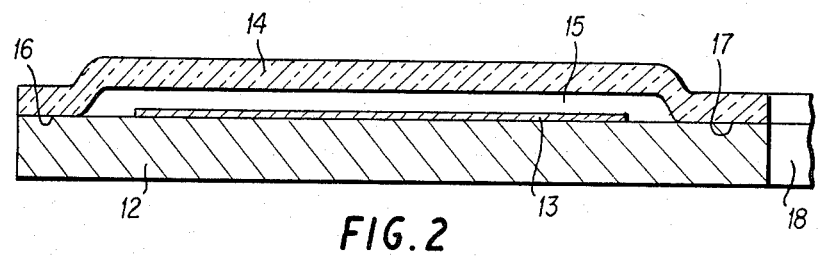

The same disadvantage will be caused by other protected optical disk structures. FIG. 2 is also a part sectional view showing a structure comprising a disk 12 forming the substrate for the inscription layer 13. The cap-like closing element 14 defines an annular chamber 15. A central hole 18 permits the passage of a driving spindle. At least one of the elements 13 and 14 gives access to the optical reading or writing radiation. Cap 14 is fixed to substrate 12 along two concentric areas, a peripheral area 16 and a central area 17. It is readily apparent that in the case of FIG. 2 the deformations of the box formed by elements 12 and 14 will affect the flatness and smoothness of layer 13.

Figure 3:
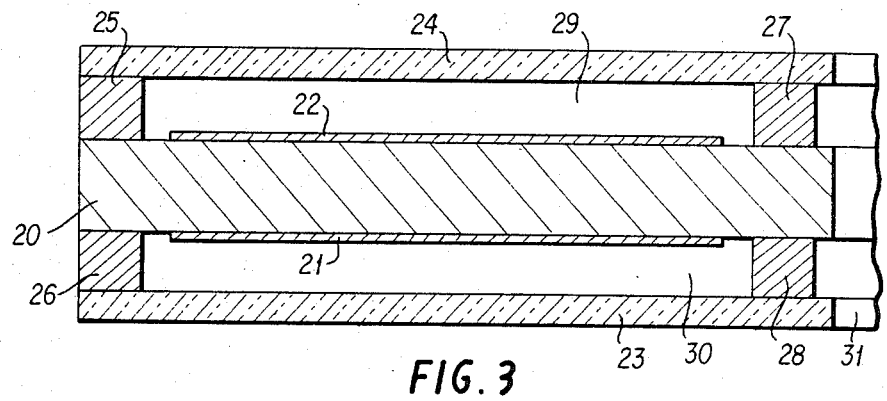

FIG. 3 is a part-sectional view of a double-face optical disk structure. It comprises three disk-like elements, namely an opaque substrate 20 supporting two inscription layers 21, 22, one layer being placed on each substrate face. The box of the structure is produced as a result of the presence of two disk-shaped elements transparent to the optical reading and writing radiation. These are formed by disks 23, 24, which surround substrate 20. As a result of the presence of circular, concentric spacers, 25, 26, 27, 28, disks 23 and 24 define annular chambers 29, 30 above the inscription layers. A central hole 31 permits the passage of a driving spindle. Here again, the deformation of the box and substrate will affect the flatness and smoothness of the inscription layers.

In order to protect the inscription layer from deformations occurring in the box, the present invention proposes that the substrate be fixed to the box by a single annular area. The following drawings propose the fixing of the substrate to the box in a central area, but it can also be fixed to the substrate in a peripheral area.

Figure 4:
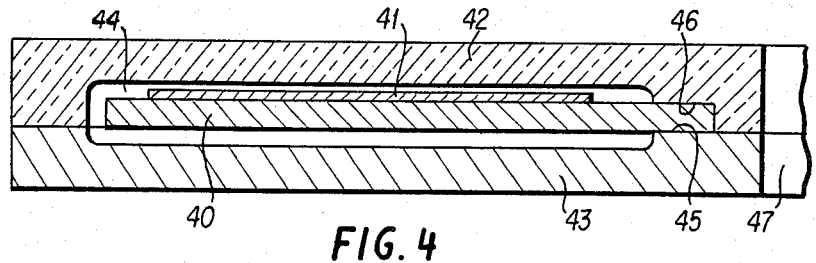
FIG. 4 a part-sectional view of a protected optical disk according to the invention.

FIG. 4 is a part-sectional view according to the invention in which the information storage layer 41 in an annular zone is supported by a rigid substrate 40 serving as a layer holder. This substrate can be an aluminium disk with a thickness of approximately 1 mm. The box of the structure is constituted by elements 42, and 43, which are shaped like a cap and define an annular chamber 44 extending on either side of substrate 40. The substrate is joined to the box by central areas 45 of elements 43 and 46 of element 42. A driving spindle passes through central hole 47. Substrate 40 is fixed to elements 42 and 43, by adhesion, riveting or welding. Elements 42 and 43 can be made from the same or different materials. They can be made from a plastics material, e.g. polymethyl methacrylate (PMMA). The substrate material can be chosen as a function of its rigidity, in order to minimize deformations due to its own weight. As the inscription and reading of layer 41 takes place by a light beam traversing element 42, the latter must be transparent to said beam and have a good optical quality in the area facing the inscription zone.

Substrate 40 can be made from a non-metallic, e.g. plastic material, which can be an absorbent material. As the inscription layer provides a relatively effective moisture seal, the substrate can then be impregnated with moisture on the surface not supporting the inscription layer and as a result of a deterioration of the quality if its surfaces can lose its flatness and smoothness. To obviate this phenomenon, it is necessary to cover this surface with an impermeable blocking layer which, if appropriate, can be a recording layer.

In the proposed structure, the geometrical shape of the substrate is consequently not affected by possible deformation of the box. It is assumed that as a result of its construction, the space between the substrate and the box is sufficient to prevent any contact between them under the effect of expansion or any other effect due to centrifugal forces during the use of the protected optical disk.

Figure 5:
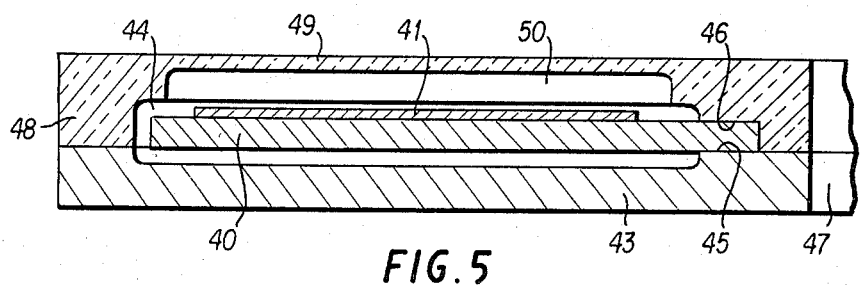
FIGS. 5 and 6 variants of a protected optical disk according to the invention.

Parallelism deficiencies of the part of the cap positioned in the path of the optical reading or writing beam, due to possible deformations, can be prejudicial to reading or writing. These disturbances can be minimized by reducing the thickness of the cap in the area in said path. This is shown in FIG. 5, which is a part-sectional view of a structure according to the invention. It incorporates many of the components of the structure of FIG. 4 and the same references are used. The essential difference compared with FIG. 4 is the shape of cap 48 facing the inscription layer. The latter has a recess 50, which prevents the thickness of the cap excessively disturbing the optical reading or writing beam. In such a construction, on the path of the optical beam and centered on said axis, cap 48 has a thinner annular zone 49 with a sufficiently small thickness (e.g. 0.5 mm or less) not to significantly disturb the focusing of the light beam on layer 41.

Figure 6:
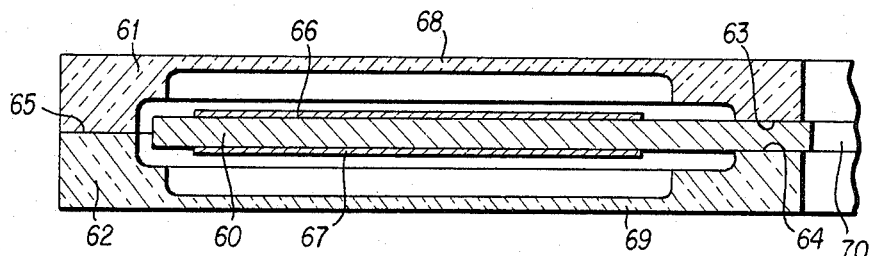

The present invention also covers double-face structures. Thus, in the embodiment of FIG. 4, it is possible to place a second inscription layer on the bare face of substrate 40. FIG. 6 shows a double-face structure obviating disturbances of the optical reading or writing beam. It is a part-sectional view comprising a substrate 60 in a box formed by two cap-shaped elements 61, 62. The substrate is rigid and can be of aluminium. It is joined to elements 61, 62, along areas 63, 64 positioned close to the centre of the structure either by adhesion, or by riveting, or by welding. In the same way elements 61, 62 are joined along peripheral area 65. One of the faces of the substrate supports an inscription layer 66, whilst the other carries a layer 67. Elements 61, 62 have facing inscription zones of the limited thickness areas 68, 69 (approximately 0.5 mm). However, these areas must not be made too thin, so that the box retains a certain rigidity. It is pointed out that, in this variant, the centering hole 70 makes it possible to directly centre the substrate on the driving spindle, because these central holes in the elements of the box have a diameter greater than the driving spindle diameter. This is more accurate than when centering takes place via the box.

In the area overlapping the inscription zone, one of the closing elements can be constituted by a flexible film, which is transparent to the reading or writing beam. The plastic films are generally obtained by extrusion and calendering and are consequently very birefringent. In order to ensure that these birefringence phenomena do not cause disturbances to the optical radiation, the film must be made sufficiently thin. For example, it is possible to use a calendered polyvinyl chloride sheet with a thickness of 0.2 mm or less.

Figure 7:
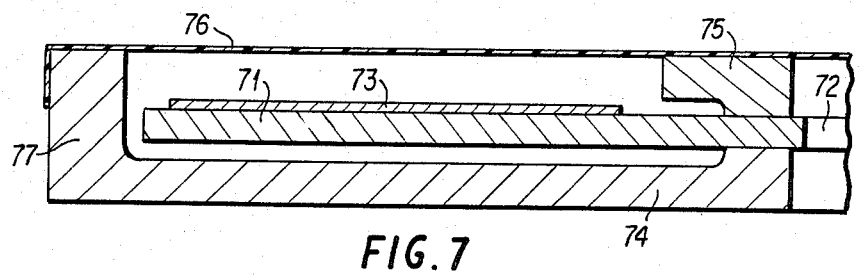
FIGS. 7 and 8 part-sectional views of the protected optical disk according to the invention, and having flexible closing elements.

FIG. 7 is a part-sectional view of a structure according to the invention using such a film. It is possible to see substrate 71, which by its centering hole 72 is directly centred on the driving spindle. The substrate can be an aluminium disk with a thickness of approximately 1 mm. It supports an inscription layer 73 concentrically with respect to the centering hole. The components of the protective box comprise elements 74, 75 and film 76. Element 74 acts as a lower cap. It can be seen that its peripheral edge 77 rises up to layer 73. Element 75 is limited to the central part of the structure. The closure of the box is completed by a slightly taut flexible film 76. It can comprise a calendered polyvinyl chloride sheet having a thickness of a few hundredths of a mm. The fixing of film 76 to elements 74, 75 can take place by adhesion or welding.

Figure 8:
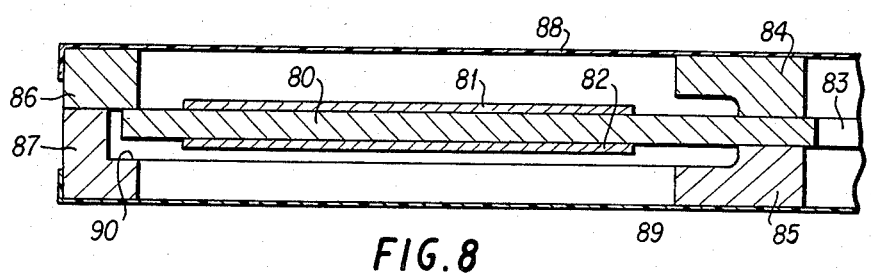

It is possible to adapt this structure using the flexible closing element to the case of a double face, as shown in the part-sectional view of FIG. 8. It is possible to see the e.g. aluminium substrate 80, whose upper face supports a first inscription layer 81 and whose lower face supports a second layer 82. It has a central hole 83 forming the centering hole for the structure. Elements 84, 85, which are rings positioned concentrically with respect to the centering hole 83, are fixed to this disk-shaped substrate. On the periphery of the structure it is possible to see elements 86, 87, joined by adhesion, riveting or welding. Ring 87 has a shoulder 90 permitting the friction-free passage of the substrate. A centrally perforated film 88 closes the upper face of the structure and is fixed to elements 84 and 86. Film 89 fulfils the same function on the lower face of the structure and is fixed to elements 85 and 87. The characteristics of films 88 and 89 have been described hereinbefore. At rest, the box constituted by rings 84, 85, 86 and 87 and by films 88 and 89 rests on the periphery of the substrate without any contact with the inscription layers. When the structure is rotated, due to the centrifugal forces resulting from the driving speed, the assembly formed by rings 86 and 87 is slightly disengaged from the substrate and stretches films 88 and 89.

Figure 9:
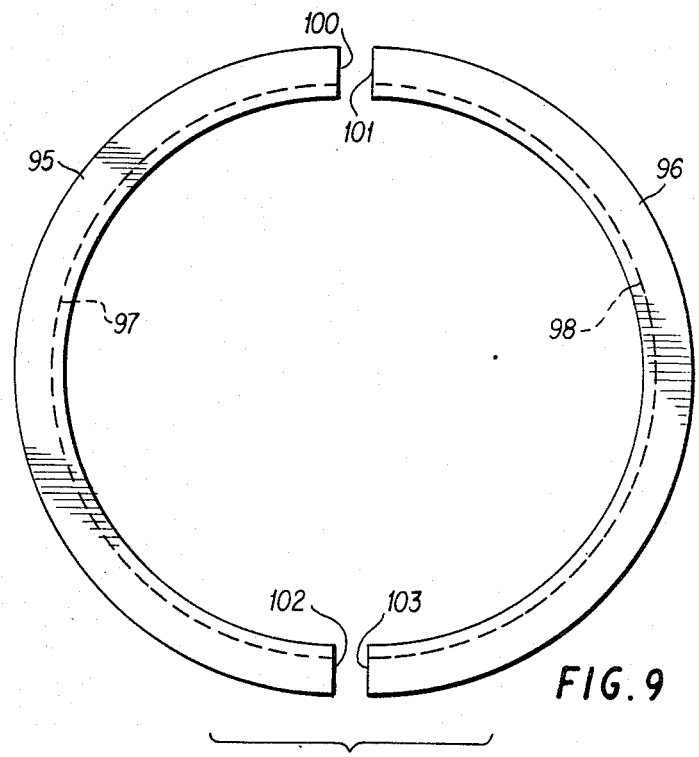
FIG. 9 a plan view of two half-rings forming a protected optical disk box element.

Another manner of designing the external rings is shown in FIG. 9, which is a plan view of two half-rings 95, 96. Each half-ring has an inner groove, whose bottom is shown by the dotted lines 97, 98. During assembly, the substrate enters the grooves of half-rings 95, 96, which are then joined to one another by adhesion or welding of faces 100, 101, as well as faces 102, 103.

The boxes described hereinbefore generally comprise cap-shaped elements. However, the scope of the invention also covers the replacement of these caps by essentially planar members, associated with spacers.

The structures according to the invention are particularly suitable for protective measures intended to combat deterioration to inscription layers caused by oxidation or moisture. There are numerous protective means and they can be combined with one another, i.e.

deposition of absorbent material on the inner wall of the box; without any covering of the inscription zone;

moisture barrier covering;

easily oxidizable material used as an oxygen trap.

What is claimed is:

1. An information optical storage device comprising: a disc-shaped base member;
first and second confronting disc shaped protective members arranged one on each side of said disc-shaped base member, at least one of said protective members having an annular recess in confronting relationship with said base member;
a radiant-energy responsive recording medium disposed between said base member and one of said protective members within said annular information storage region, said storage region having a radially inner end with a radius greater than an inner radius of said annular recess and a radially outer end with a radius less than an outer radius of said annular recess, said base member being closely embraced between respective raised annular edges of said first and second protective members located only at one radial end of said storage region;
means for fastening said raised annular edges to lateral faces of said base member, at least one of said protective members having a further raised annular edge at a second radial end of said storage region, means for fastening said first and second protective members to one another along said further raised annular edges,
whereby said information storage region is exposed to an atmosphere enclosed by the combination of said protective members, the embraced portion of said base member and said fastening means and said base member having a free circumferential edge sufficiently spaced from said combination to prevent any contact therebetween as a result of relative radial and axial movements between said base member and said protective members.

2. A device according to claim 1, wherein the base member supports said recording medium on a first face and an impermeable blocking layer on another face thereof.

3. A device according to claim 1, wherein at least one of said protective members has received on an inner face thereof a deposit forming a moisture barrier and which does not disturb the radiant energy.

4. A device according to claim 1, wherein an easily oxidizable material is deposited in said enclosed atmosphere in an area which does not hide the inscription zone.

5. A storage device as claimed in claim 1, wherein at least one of said protective members comprises a thin annular portion forming the bottom of said annular recess.

6. A storage device as claimed in claim 5, wherein said thin annular portion is a flexible film.

7. A storage device as claimed in claim 6 including thin annular portions for both of said protective members, wherein said first and second protective members respectively comprise first and second flexible films forming the bottom of said recess for each of said protective members, each one of said flexible films being bonded to a radially inner ring and a radially outer ring of said protective members, said inner rings being bonded to said base member and said outer rings being bonded together.

8. A storage device as claimed in claim 7, wherein one of said outer rings is radially inwardly grooved to form a circumferential recess, wherein the radially outermost end of said base member is provided with clearance with respect to said outer rings sufficient to allow both for relative radial and axial movements between said outer rings and said base member.

9. A storage device as claimed in claim 7, wherein one of said outer rings is made of two half circular rings.

10. A storage device as claimed in claim 1, wherein said raised annular edges are radially inner edges, said further raised annular edge being a radially outer edge.

11. An information optical storage device comprising:
a disc-shaped base member;
first and second confronting disc-shaped protective members arranged one on each side of said disc-shaped base member, at least one of said protective members having an annular recess in confronting relationship with said base member;
a radiant energy responsive recording medium arranged in an annular information storage region on one face of said base member, said storage region having a radially inner end with a radius greater than an inner radius of said annular recess and radially outer end with a radius less than an outer radius of said annular recess, said base member being closely embraced between respective raised annular edges of said first and second protective members located only at one radial end of said storage region;
means for fastening said protective members to each other and to said base member, whereby said information storage region is exposed to an atmosphere enclosed by the combination of said protective members, the embraced portion of said base member and said fastening means;

a centering hole in said base member, said centering hole being of smaller size than holes provided in said protective members for access of spindle means closely fitting said centering hole, said base member having a free circumferential edge sufficiently spaced from said combination to prevent any contact therebetween as a result of relative radial and axial movements between said base member and said protective members.

* * * * *